United States Patent [19]

Mead

[11] Patent Number: 5,590,452
[45] Date of Patent: Jan. 7, 1997

[54] JOINT SEPARATION APPARATUS

[75] Inventor: John Mead, Horsham, England

[73] Assignee: Mead Machinery Limited, West Sussey, Great Britain

[21] Appl. No.: 583,540

[22] Filed: Jan. 5, 1996

Related U.S. Application Data

[63] Continuation of Ser. No. 273,011, Jul. 8, 1994, abandoned.

[30] Foreign Application Priority Data

Jul. 10, 1993 [GB] United Kingdom .................. 9314281

[51] Int. Cl.$^6$ .................................................. B23P 19/04
[52] U.S. Cl. ............................................ 29/239; 29/252
[58] Field of Search ............................. 29/256, 239, 237, 29/252; 254/106, 30, 29 R; 269/43

[56] References Cited

U.S. PATENT DOCUMENTS

| | | | |
|---|---|---|---|
| 1,310,806 | 7/1919 | Rollins | 29/256 |
| 1,326,426 | 12/1919 | Shea | 254/29 R |
| 2,654,569 | 10/1953 | Cooper | 254/29 R |
| 2,680,287 | 6/1954 | Wilson | 29/239 |
| 2,915,282 | 12/1959 | Hixson | 254/29 R |
| 2,952,131 | 9/1960 | Lyroudias | 254/30 |
| 3,317,185 | 5/1967 | Burk et al. | 254/30 |
| 3,369,793 | 2/1968 | Boldrick et al. | 254/30 |
| 3,711,920 | 1/1973 | Simmons | 269/43 |
| 3,866,883 | 2/1975 | Goransson | 29/239 |
| 3,973,315 | 8/1976 | Thanghe | 29/239 |
| 4,441,844 | 4/1984 | Miller | 29/239 |
| 4,657,225 | 4/1987 | Hoehn et al. | 29/239 |

*Primary Examiner*—Robert C. Watson
*Attorney, Agent, or Firm*—Kinney & Lange, P.A.

[57] ABSTRACT

Joint separating apparatus comprises clamping means for releasably securing the apparatus to one element of a joint between it and a second element of the joint, and pressure means actuable to exert pressure on the second element to separate the elements at least partially.

23 Claims, 4 Drawing Sheets

JOINT SEPARATION APPARATUS

BACKGROUND OF THE INVENTION

This is a file wrapper continuation of application Ser. No. 08/273,011, filed Jul. 8, 1994, now abandoned.

This invention relates to an apparatus for the separation of joints and particularly, but not exclusively, the invention is concerned with an apparatus for the separation of nailed joints between wooden elements.

SUMMARY OF THE INVENTION

In accordance with the invention there is provided a joint separating apparatus comprising clamping means for releasably securing the apparatus to one element of a joint between it and a second element of the joint, and pressure means actuable to exert pressure on said second element to separate said elements at least partially.

In such an apparatus the reactive force generated by the pressure means when actuated to exert pressure on said second element of the joint is transmitted through the clamping means of the apparatus to said first element of the joint.

The apparatus conveniently comprises a pair of arms each of which has a clamping member provided thereon and at least one of which can be moved towards the other whereby a first element of a joint may be releasably clamped between opposed surfaces of the clamping members when a clamping force is applied between them. Preferably a fluid pressure actuated piston and cylinder assembly is connected between the pivotally connected arms and is operable to initiate relative movement between the clamping members carried by the arms. Each of the clamping members may comprise a clamping plate mounted on a respective arm and being provided with a gripping surface for engagement with a first element of a joint.

The pressure means preferably comprises a fluid pressure actuated ram carried by each of the arms of the apparatus. Each of the rams conveniently has a cylinder thereof secured to the respective arm and a piston rod having a presser plate at one or both of its free ends for engagement with a said second element of the joint.

Each of the fluid pressure actuated rams and the piston and cylinder assemblies conveniently comprises a pneumatic device operable by compressed air.

Each of the rams is conveniently mounted on a respective arm of the apparatus and is capable of extension in a direction which is normal to the plane in which relative movement of the clamping members occurs. Thus for example if it is desired to separate two elements of a nailed joint wherein a first joint element comprises a wooden block and a second joint element comprises a wooden board nailed to one end of the block, the apparatus of the invention may initially be secured to the block by effecting relative movement between the opposed clamping members in a generally horizontal plane to clamp opposite sides of the block of the joint therebetween, clamping pressure being maintained by the piston and cylinder assemblies. Vertically directed pressure may then be applied to the board of the joint by one or both rams, to press the board away from the end of the block to which it is nailed.

Joint separating apparatuses constructed as described above may be utilised to effect an initial separation of a nailed joint subsequent to which a cutting or shearing element may be insertable into the space between the separated elements of the joint for cutting the nails.

Other features of the invention will become apparent from the following description given herein solely by way of example with reference to the accompanying drawings.

DETAILED DESCRIPTION OF THE PREFERRED EMBODIMENT

Figure 1:
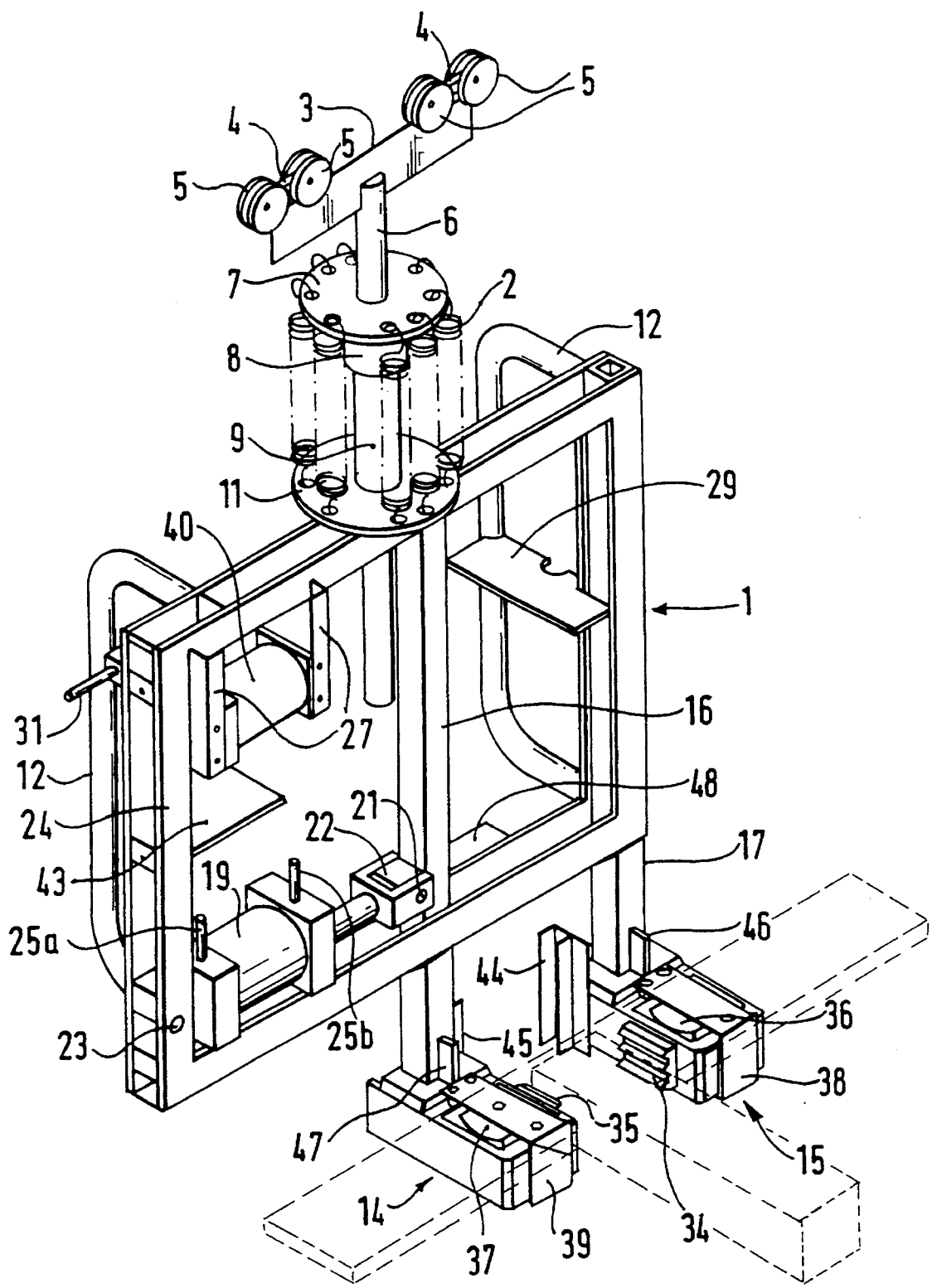
FIG. 1 is a perspective view of joint separating apparatus in accordance with the invention.
Figure 2:
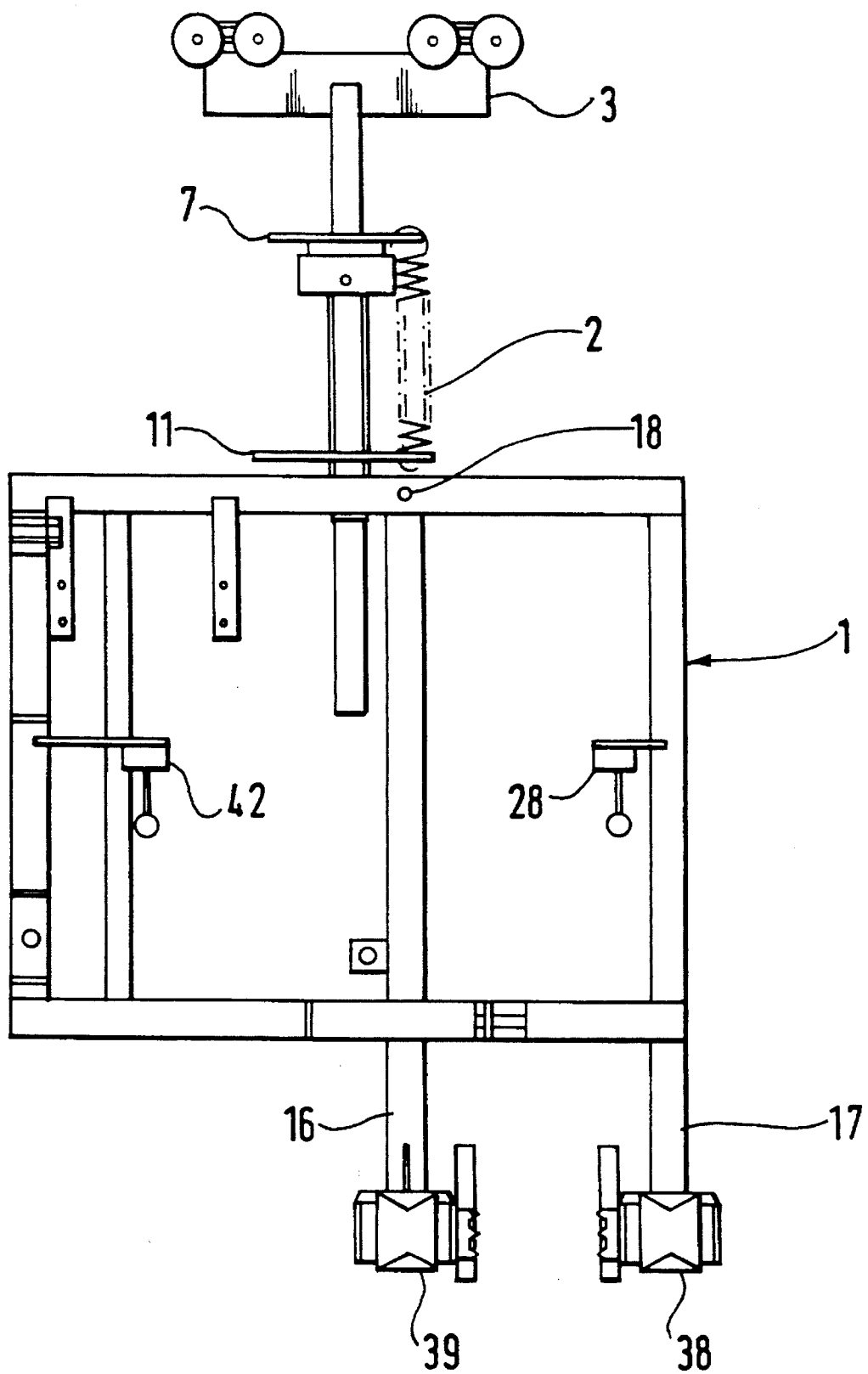
FIGS. 2 to 4 are respectively rear, plan and side views of the apparatus shown in FIG. 1.
Figure 3:
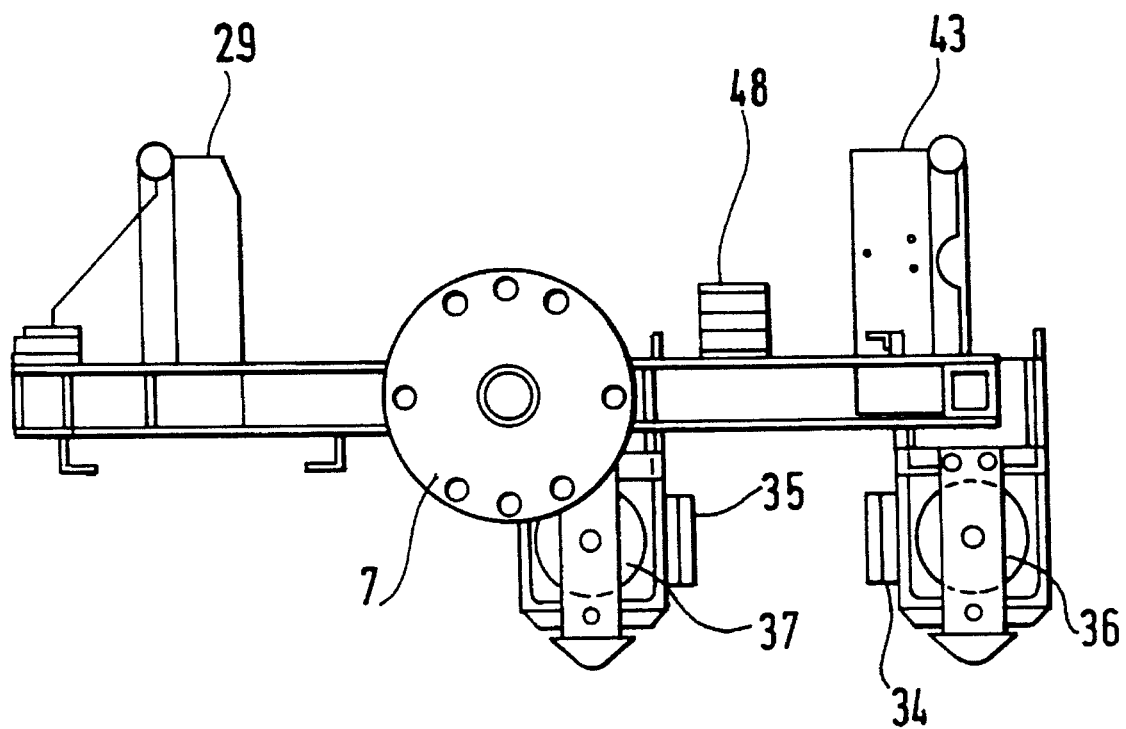
Figure 4:
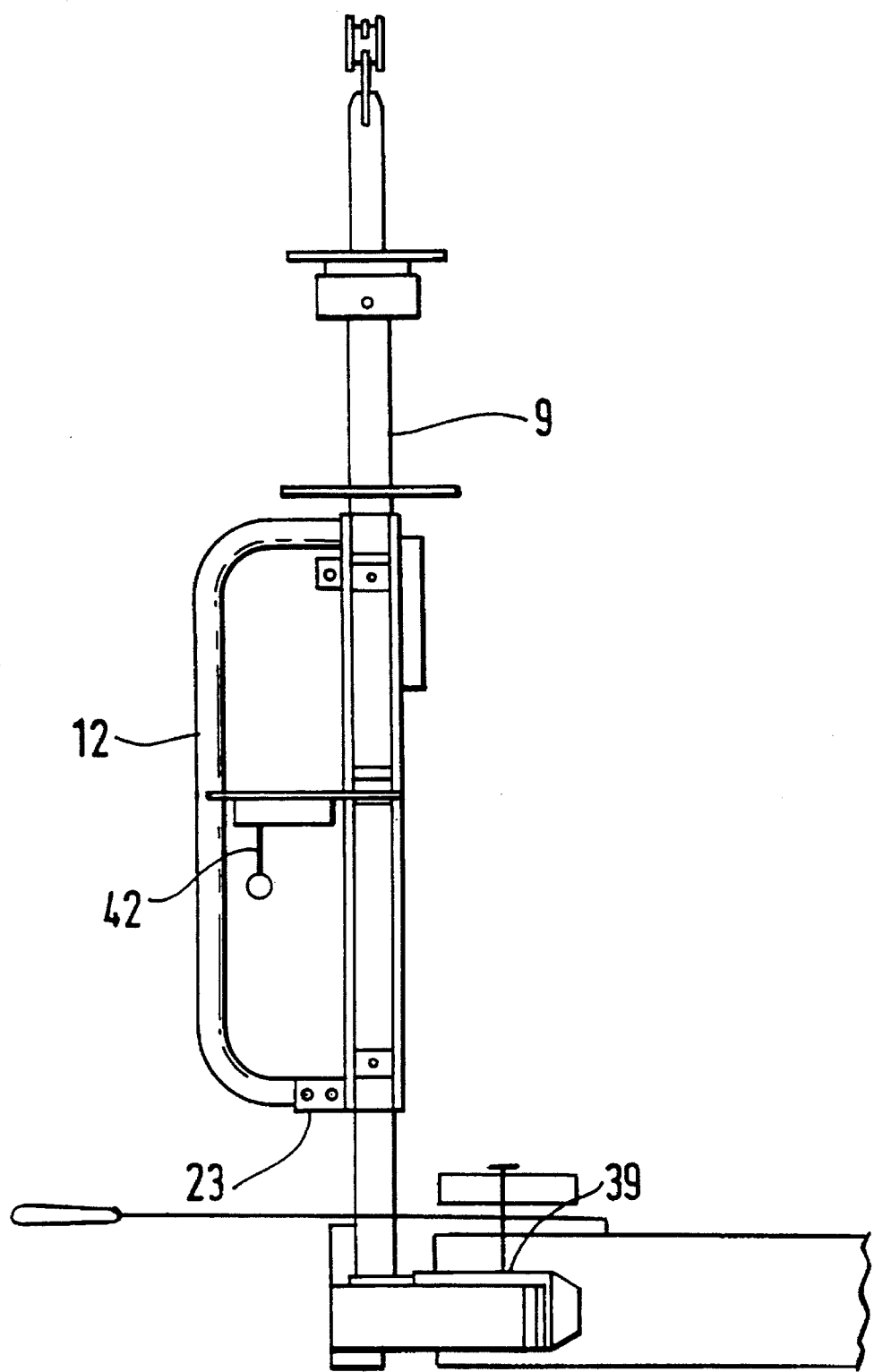

The joint separating apparatus illustrated in the drawings comprises a frame 1 suspended by a system of coil springs 2 from a carrier 3 secured at each of its ends to a joining bracket 4 of pulley wheels 5 movable along a track (not shown). The track may be fixed or movable, that is to say it may be rotatable about a fixed support. The carrier 3 supports a downwardly extending rod 6 which passes through an upper plate 7 and is attached to a collar 8 on which the plate 7 seats. Upstanding from and secured to the frame 1 is a sleeve 9 through which the rod extends. Secured to the outer circumference of the sleeve 9 is a lower plate 11. The coil 2 springs interconnect the plates 7, 11 and permit relative vertical movement of the frame 1 relative to the rod 6. The coil springs 2 also enable the frame 1 to be rotated about the rod 6 for ease of manoeuvrability. Handles 12 are provided on the rear side of the frame.

The frame 1 supports a pair of opposed clamping members 14, 15 each of which is carried by an upwardly extending arm 16, 17 respectively of the frame. The arm 17 is fixed to the frame and the arm 16 is mounted for pivotal movement about a pivot 18 towards and away from the arm 17 by a fluid actuated piston and cylinder assembly 19. The piston of the assembly 19 is pivotally connected by a pin 21 to an extension piece 22 of the arm 16. The cylinder of the assembly 19 is pivotally connected by a pin 23 to an upright 24 of the frame 1.

The assembly is conveniently actuated by compressed air and may be powered to move the arm 16 either towards or away the arm 17. Compressed air is fed selectively to one or other ends of the cylinder of the assembly 19 via pipes 25a/25b connected to a three way valve operated by a control lever 28, supported from a plate 29 secured to the frame 1. Compressed air from an airline passes through the valve and thence to one of the pipes 25a, 25b.

The free end of each arm 16, 17 carries a respective clamping member 14, 15. Each clamping member includes a clamping plate 34, 35 having a gripping surface which may be suitably toothed or otherwise serrated to enhance the gripping of one element of a joint to be separated.

Each clamping member carries a double-acting fluid operated ram assembly including a vertically mounted piston 36, 37 which moves within a complementary cylinder secured to the respective member. The upper and lower surfaces of each piston can stand proud of the respective upper or lower surface of the clamping member. Each piston 36, 37 carries a "U" shaped presser plate 38, 39 for engagement with a second element of a joint to be separated. Thus the pressure exertable by each presser plate 38, 39 of the two ram assemblies is in a direction normal to the plane in which the clamping members grip the first element of the joint. The permitted vertical movement of the presser plates may be of the order of 12 mm.

The double acting pistons 36, 37 of the ram assemblies are moved by compressed air admitted selectively or sequentially to the cylinder via pipes 41 connected to an air line 31 through a three-way valve of a pressure enhancer 40 operated by a control lever 42 supported from a plate 43 secured to the frame 1. The enhancer 40 increases the air line pressure by, for example, a factor of three. A support bracket 48 for the pipes 25A, 25B and 41 is secured to the frame 1.

Mounted one to each opposing side face of the clamping members 14, 15 are fulcrum plates 44, 45 to assist alignment of a manually operated saw used to cut through or shear nails exposed by operation of the ram assemblies. Spacing members 46, 47 are provided to assist proper location of the clamping members relative to the elements to be separated.

In use, the joint separating apparatus may be utilised, for example, to separate two elements of a joint comprising a wooden board nailed to an upper end of a wooden block. In such an application the apparatus would initially be secured to opposite sides of the block by positioning the surfaces 34, 35 of the clamping members 14, 15 adjacent such opposite sides and then powering the piston and cylinder assembly 19 through operation of the control lever 28 to bring the gripping surfaces 34, 35 into clamping engagement with opposite sides of the block. In this position, the pistons 36, 37 are positioned adjacent opposite sides of the block and below the boards nailed to the upper ends of the block whereby upon extension of the pistons 36, 37 from the cylinders of the assemblies, the respective presser plates 38, 39 force the board upwardly from the upper end of the block. The reactive forces generated by the presser plates 38, 39 of the pistons pressing against the board are transmitted through the clamping members 32, 33 and hence to the block. The clamping members are then repositioned to enable the pistons to act against the board nailed to the lower end of the block.

It is envisaged that the apparatus may primarily be used for effecting an initial separation between elements of a joint whereby the joint may be subsequently fully disassembled by shearing or cutting the nails which remain in situ between the elements of the joint. The exposed nails are simply cut using a powered saw which can locate on the fulcrum plates 44, 45 for ease of cutting.

In an unillustrated embodiment, both arms 16, 17 are mounted for pivotal movement so that the gripping surfaces 34, 35 of the clamping members 32, 33 are generally aligned parallel to the element surfaces to be gripped and to one another. In another unillustrated embodiment the arm 16 is removed in a generally vertical altitude towards and away from the arm 17 to achieve the same objective.

The features disclosed in the foregoing description or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A joint separating apparatus for separating discrete first and second elements of a joint which have been previously bonded together, the apparatus comprising:
   a clamping mechanism including a plurality of clamping members, wherein the clamping members are mounted on arms readily movable one relative to the other to releasably clamp the first element of the joint between opposed surfaces of the clamping members; and
   a pressure mechanism actuable to exert pressure on the second element to separate the elements at least partially, the pressure mechanism including:
      a linear actuator provided on each of said arms of the apparatus, each actuator having a pressure plate for forcefully contacting the second element of the joint, wherein actuation of each actuator causes the pressure plate and the clamping members to apply opposite forces to the first and second elements of the joint to overcome the bonding between the first and second discrete elements.

2. The apparatus of claim 1 wherein each linear actuator comprises a pneumatic device operable by compressed air.

3. The apparatus of claim 1 wherein each ram is mounted on a respective said arm of the apparatus for extension in a direction which is normal to the direction of relative movement of the clamping members.

4. The apparatus of claim 1 including a linear actuator coupled to the clamping members for moving the clamping members towards one another into clamping engagement with the first element of a joint.

5. The apparatus of claim 4 wherein the linear actuator comprises a pneumatic device operable by compressed air.

6. The apparatus of claim 1 wherein the linear actuator is double-acting to provide a separating force in two opposed directions.

7. A joint separating apparatus for separating discrete first and second elements of a joint which have been previously bonded together, the apparatus comprising:
   clamping means including a plurality of clamping members for releasably securing the apparatus to a first element of a joint;
   pressure means actuable to separate said elements at least partially; and
   a support member associated with the clamping means and configured for locating a cutting means for separating the joint once the first and second elements are partially separated.

8. The apparatus of claim 7 wherein the clamping members are mounted on arms movable one relative to the other to releasably clamp a first element of a joint between opposed surfaces of the clamping members.

9. The apparatus of claim 8 including a linear actuator coupled to the clamping members for moving the clamping members carried by the arms towards one another into clamping engagement with the first element of a joint.

10. The apparatus of claim 9 wherein the linear actuator comprises a pneumatic device operable by compressed air.

11. The apparatus as claimed in claim 8 wherein each clamping member includes a clamping plate pivotally mounted on a respective arm and provided with a gripping surface for engagement with the first element of a joint.

12. The apparatus of claim 8 wherein the pressure means includes a linear actuator provided on each of said arms of the apparatus.

13. The apparatus of claim 12 wherein each linear actuator comprises a pneumatic device operable by compressed air.

14. The apparatus of claim 12 wherein each linear actuator has a cylinder thereof secured to a respective arm and a piston rod having a pressure plate for engagement with a second element of the joint.

15. The apparatus of claim 14 wherein each linear actuator is mounted on a respective said arm of the apparatus for extension in a direction which is normal to the direction of relative movement of the clamping members.

16. The joint separating apparatus of claim 7 wherein the clamping members are mounted on arms movable one relative to the other to releasably clamp a first element of a joint between opposed surfaces of the clamping members, wherein the pressure means includes a fluid pressure actuated ram provided on each of said arms of the apparatus, each ram having a cylinder thereof secured to a respective arm and a piston rod having a pressure plate for engagement with a second element of the joint.

17. A joint separating apparatus for separating first and second discrete elements of a joint which have been previously bonded together, the apparatus comprising:
 a clamping mechanism including a plurality of clamping members, wherein the clamping members are mounted on arms readily movable one relative to the other to releasably clamp the first element of the joint between opposed surfaces of the clamping member free from attachment to the first element; and
 a pressure mechanism actuable to exert pressure on the second element to separate the first and second elements, the pressure mechanism including:
  a linear actuator provided on each of the arms of the apparatus, each actuator configured for supporting and engaging the second element free from attachment to the second element, wherein actuation of each actuator applies force to the second element to at least partially separate the first element and the second element and to permit the second element to be readily removed from the joint separating apparatus.

18. The apparatus of claim 17 including a linear actuator coupled to at least one of the clamping members for moving the clamping members towards one another for clamping the first element therebetween.

19. The apparatus of claim 17 including a linear actuator coupled to the clamping members for moving the clamping members away from one another for removing the first element from the clamping mechanism.

20. A joint separating apparatus for separating a discrete first vertical element having a first surface that has been previously bonded to a second horizontal surface of a discrete second horizontal element, the apparatus comprising:
 a clamping mechanism including a pair of opposing clamping members, wherein the clamping members are mounted on arms readily movable one relative to the other to releasably clamp the first element between opposed surfaces of the clamping members; and
 a pressure mechanism actuable to exert pressure on the second element to separate the elements at least partially, the pressure mechanism including:
  a linear actuator provided on each of the arms of the apparatus, each linear actuator abutting and applying force to the second surface of the second horizontal element to overcome the bonding between the first and second surfaces of the first and second discrete elements.

21. The apparatus of claim 20 including a linear actuator coupled to at least one of the opposing clamping members for moving the clamping members together into the clamped position.

22. The apparatus of claim 20 including a linear actuator coupled to the clamping members for moving the clamping members away from one another into the unclamped position.

23. A joint separating apparatus for separating discrete first and second elements of a joint which have been previously bonded together, the apparatus comprising:
 a side loading clamping mechanism including a pair of opposing clamping members mounted on arms movable relative to one another, and wherein the opposing clamping members are configured so that the first element and the second element may be readily loaded and removed sideways with respect to the clamping mechanism; and
 a pressure mechanism actuable to exert pressure on the second element to separate the elements at least partially, the pressure mechanism including:
  a linear actuator provided on each of the arms of the apparatus, wherein the linear actuator applies force to the second element of the joint to overcome the bonding between the first and second discrete elements.

* * * * *